United States Patent
Umemoto (10) Patent No.: US 6,554,440 B2
(45) Date of Patent: Apr. 29, 2003

(54) LIGHT PIPE, PLANE LIGHT SOURCE UNIT AND LIQUID-CRYSTAL DISPLAY DEVICE

(75) Inventor: Seiji Umemoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/729,797

(22) Filed: Dec. 6, 2000

(65) Prior Publication Data

US 2001/0020984 A1 Sep. 13, 2001

(30) Foreign Application Priority Data

Dec. 6, 1999 (JP) .......................................... 11-345908

(51) Int. Cl.[7] ................................................. F21V 7/04
(52) U.S. Cl. ..................... 362/31; 362/552; 362/558; 362/560; 362/26; 362/29; 349/62; 349/65
(58) Field of Search .......................... 362/31, 552, 558, 362/560, 26, 29, 30; 349/62, 65

(56) References Cited

U.S. PATENT DOCUMENTS

| 5,727,107 A |   | 3/1998 | Umemoto et al. ........... 385/116 |
| 5,856,855 A | * | 1/1999 | Mol et al. ...................... 349/65 |
| 6,020,944 A | * | 2/2000 | Hoshi ............................ 349/62 |

FOREIGN PATENT DOCUMENTS

EP 0 879 991 A2 11/1998 ............. F21V/8/00

* cited by examiner

*Primary Examiner*—Stephen Husar
*Assistant Examiner*—Bertrand Zeade
(74) *Attorney, Agent, or Firm*—Sughrue Mion, PLLC (57) ABSTRACT

A light pipe has an upper surface, a lower surface, side surfaces between the upper and lower surfaces, and light output means. At lease two of the side surfaces constitute incidence side surfaces each extending in left-right and front-rear directions of the light pipe. The light output means is formed in one of the upper and lower surfaces so that incident light to the one of the upper and lower surfaces from each of the incidence side surfaces is made to go out from the other one of the upper and lower surfaces by the light output means. The light output means comprises a repetitive structure of prismatic structures having ridgelines extending along each of the incidence side surfaces respectively. There is further provided a plane light source unit in which light sources are provided on the incidence side surfaces, respectively, of the light pipe, and there is still further provided a reflection type or transmission type liquid-crystal display device in which a liquid-crystal cell is disposed on the lower or upper surface side of the light pipe of the plane light source unit.

9 Claims, 3 Drawing Sheets

LIGHT PIPE, PLANE LIGHT SOURCE UNIT AND LIQUID-CRYSTAL DISPLAY DEVICE

BACKGROUND OF THE INVENTION

1. Field of the Invention

The present invention relates to a multiple light source type light pipe which can be used to constitute a plane light source unit excellent in light utilizing efficiency and excellent in luminance and uniformity of luminance and to constitute a reflection type or transmission type liquid-crystal display device bright and easy to view, and which can provided as an emission light color change system.

The present application is based on Japanese Patent Application No. Hei. 11-345908, which is incorporated herein by reference.

2. Description of the Related Art

A heretofore known light pipe is a side-lighting type light pipe made of a plate-like member having rough surfaces or white dots in one of the upper and lower surfaces for scattering light incident on the side surfaces of the light pipe to thereby output the scattered light to the other one of the upper and lower surfaces. Such a side-lighting type light pipe is used as follows. That is, a light source is disposed on a side surface of the light pipe to thereby form a plane light source unit. The plane light source unit is combined with a liquid-crystal cell to thereby form a reflection type or transmission type liquid-crystal display device.

There was, however, a problem that the side-lighting type light pipe was inferior in luminance and uniformity of luminance and inferior in display quality. Although there was a proposal to dispose light sources on a plurality of side surfaces in order to improve luminance, it was difficult to eliminate variation in luminance. Incidentally, liquid-crystal display devices are classified into a back-lighting system and a front-lighting system in accordance with the position of arrangement of the plane light source unit relative to a liquid-crystal cell. In the aforementioned scattering system, there was a problem that it was difficult to use the scattering system as a front-lighting system because a display image was disturbed in the scattering system. Such a front-lighting system has been in demand for improvement, so that light emission colors can be changed in the front-lighting system in the same manner as that in the back-lighting system, with the advance of popularization of application of liquid-crystal display devices to portable telephone sets, etc.

SUMMARY OF THE INVENTION

An object of the present invention is to develop a light pipe which can be used to constitute a plane light source unit excellent in light utilizing efficiency and excellent in luminance and uniformity of luminance and to constitute a reflection type or transmission type liquid-crystal display device bright and easy to view, and which can be applied also to a front-lighting system so that light emission colors can be changed.

According to an aspect of the present invention, there is provided a light pipe comprising: a plate-like member at least having an upper surface, a lower surface, and side surfaces between the upper and lower surfaces, at lease two of the side surfaces constituting incidence side surfaces extending in left-right and front-rear directions of the plate-like member; and a light output means formed in selected one of the upper and lower surfaces so that incident light incident light to the one of the upper and lower surfaces from each of the incidence side surfaces is made to go out from the other one of the upper and lower surfaces by the light output means, the light output means being constituted by a repetitive structure of prismatic structures having ridgelines extending along each of the incidence side surfaces respectively.

According to another aspect of the present invention, there is provided a plane light source unit comprising the aforementioned light pipe, and light sources disposed on the incidence side surfaces, respectively, of the light pipe.

According to another aspect of the present invention, there is provided a reflection type liquid-crystal display device comprising the aforementioned plane light source unit using a light pipe made of a plate-like member having a light output means in its upper surface, and a reflection layer-including liquid-crystal cell disposed on the lower surface side of the light pipe of the plane light source unit.

According to another aspect of the present invention, there is provided a transmission type liquid-crystal display device comprising the aforementioned plane light source unit using a light pipe made of a plate-like member having a light output means in its upper or lower surface, a transmission type liquid-crystal cell disposed on the upper surface side of the light pipe of the light source unit, and a light reflection means disposed on the lower surface side of the light pipe.

According to the present invention, light from a light source is made to be incident on at least two side surfaces of a light pipe so that the incident light is made to exit from one and the same surface through a light output means constituted by a repetitive structure of prismatic structures. Hence, the light from the light source can be converted efficiently to form a plane light source, and a plane light source unit excellent in luminance and uniformity of luminance can be obtained. When the plane light source unit is used as a back-lighting or front-lighting system, a reflection type or transmission type liquid-crystal display device bright and easy to view can be formed. Further, a liquid-crystal display device using a front-lighting or back-lighting system, in which light emission colors can be changed according to the combination of different-color emission light sources can be also formed.

Features and advantages of the invention will be evident from the following detailed description of the preferred embodiments described in conjunction with the attached drawings.

DETAILED DESCRIPTION OF THE PREFERRED EMBODIMENTS

Figure 1:
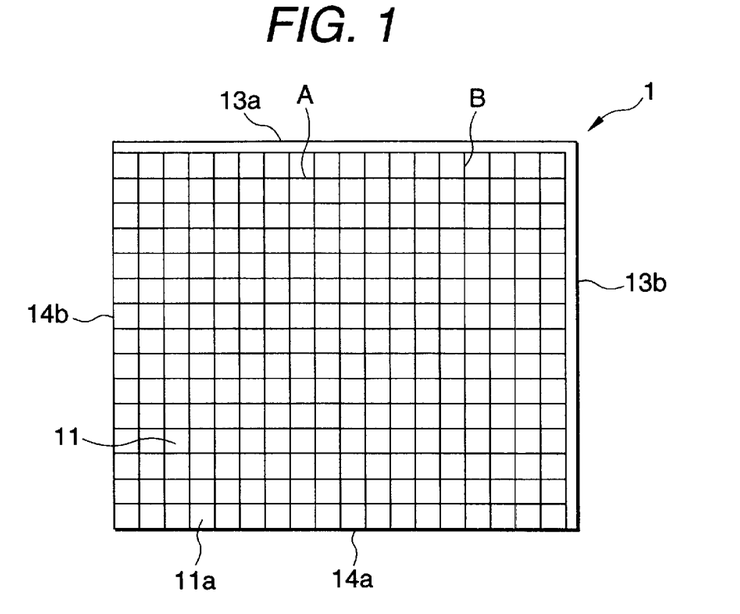
FIG. 1 is a plan view for explaining an example of a light pipe.
Figure 2:
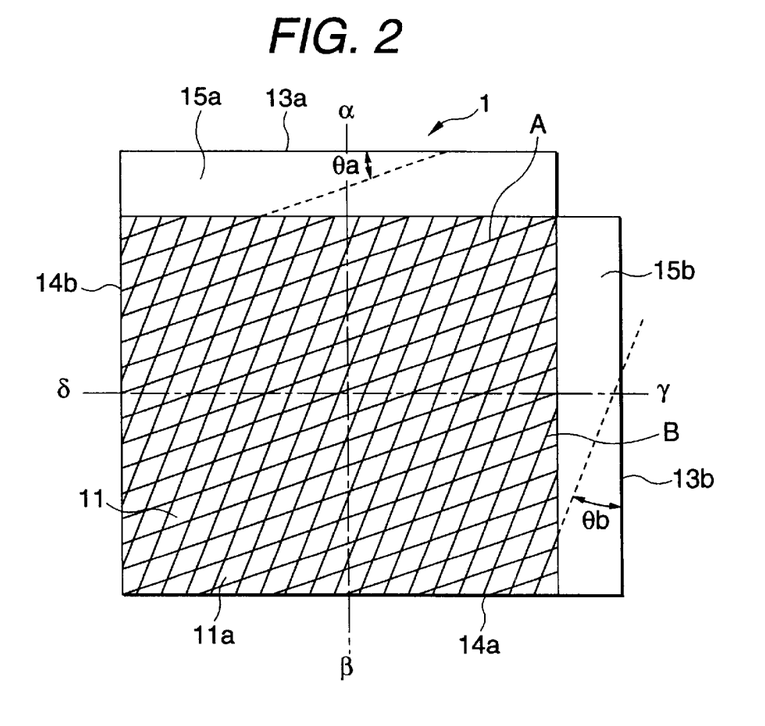
FIG. 2 is a plan view for explaining another example of the light pipe.
Figure 3:
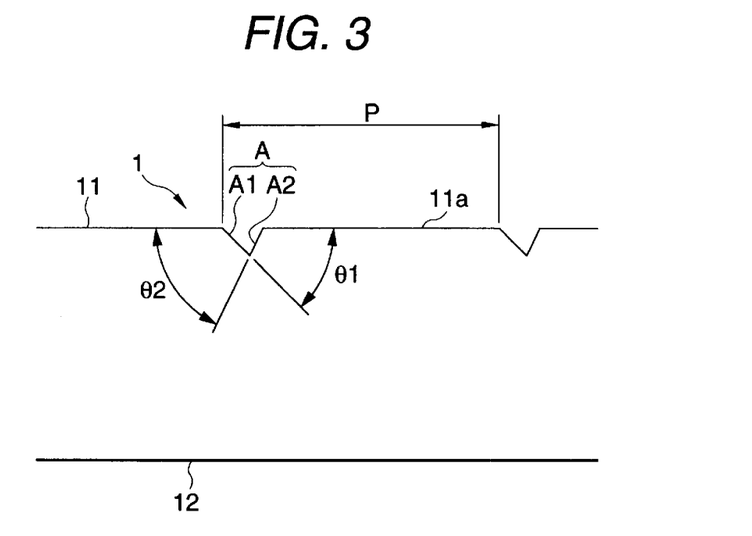
FIG. 3 is a side view for explaining an example of a light output means in the light pipe.

The light pipe according to the present invention comprises: a plate-like member at least having an upper surface, a lower surface, and side surfaces between the upper and lower surfaces, at lease two of the side surfaces constituting incidence side surfaces extending in left-right and front-rear directions of the plate-like member; and a light output means formed in selected one of the upper and lower surfaces so that incident light incident light to the one of the upper and lower surfaces from each of the incidence side surfaces is made to go out from the other one of the upper and lower surfaces by the light output means, the light output means being constituted by repetitive prismatic structures having ridgelines extending along each of the incidence side surfaces respectively. FIGS. 1 and 2 show examples of the light pipe. In FIGS. 1 and 2, the reference numeral 1 designates a plate-like member constituting the light pipe; 11, an upper surface of the plate-like member 1; and 13a and 13b, incidence side surfaces thereof. Incidentally, as shown in FIG. 3, a lower surface 12 of the plate-like member 1 is located so as to be opposite to the upper surface 11.

The incidence side surfaces are provided so that light sources are disposed on the incidence side surfaces to make light incident on the incidence side surfaces. In the present invention, at least two side surfaces between the upper and lower surfaces of the plate-like member 1 as shown in FIGS. 1 and 2 are used as the incidence side surfaces 13a and 13b. That is, the side surface 13a extending in the left-right direction and the side surface 13b extending in the front-rear direction are used in combination. Hence, light can be made incident on at least two side surfaces from separate light sources to thereby make improvement of luminance and change of emission light color possible.

Figure 4:
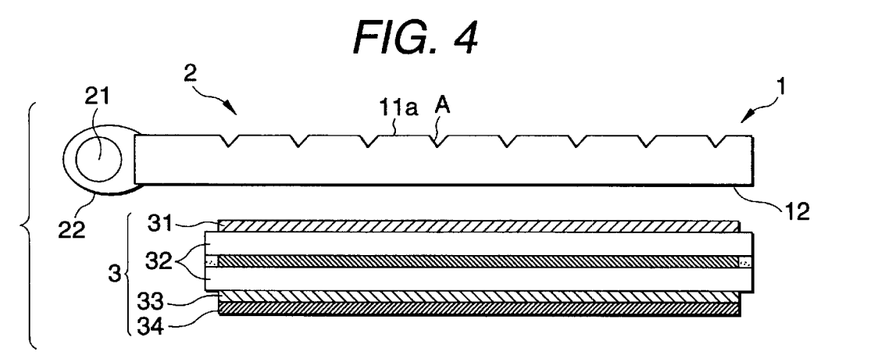
FIG. 4 is a view for explaining an example of a reflection type liquid-crystal display device using a front-lighting system.

On the other hand, the light output means formed in one of the upper and lower surfaces of the plate-like member is provided so that light incident on the incidence side surfaces is made to go out from the other of the upper and lower surfaces by the light output means. In the present invention, the light output means is constituted by a repetitive structure of prismatic structures as represented by A in FIGS. 3 and 4. The prismatic structures are formed so that the ridgelines A and B of the prismatic structures are aligned with the incidence side surfaces 13a and 13b as shown in FIGS. 1 and 2. Incidentally, FIG. 4 is a sectional view taken along the line α-β or γ-δ in FIG. 2 and schematically showing the light pipe 1.

From the above description, the light output means can be disposed in accordance with the incidence side surfaces. Either of the upper and lower surfaces can be used as a common light exit surface so that light can be made to exit from the common light surface with good directivity. Hence, improvement of light utilizing efficiency, etc. can be achieved. Incidentally, the light pipe 1 which has the light output means in its upper surface 11 so that light exits from its lower surface 12 is shown in the drawings. That is, the light pipe 1 which has the lower surface serving as a light exit surface is shown in the drawings. From the point of view of increasing the optical path length through the thickness of the light pipe to moderate the formation of emission lines of light output through the light output means to standardize the luminance to thereby improve uniformity of light emission, it is preferable to use a plate-like member having a light output means formed in its upper surface so that its lower surface is used as a light exit surface. This plate-like member is particularly preferably used for a front-lighting system.

The light output means used preferably from the point of view of light utilizing efficiency, etc. has slopes in its light exit surface side so that an optical path can be controlled through reflection, especially full reflection of light incident on the incidence side surfaces. The prismatic structures having such slopes can be formed by suitable structures each having equal-side surfaces, or the like.

The preferable prismatic structure is made so that light as large in quantity as possible exits from the light exit surface of the light pipe in a direction perpendicular (normal) to the reference plane and so that the direction of light leaking from the light pipe is prevented as sufficiently as possible from overlapping the direction of the exit light serving as display light when the light source unit is used as a front-lighting system for a reflection type liquid-crystal display device. If leaking light overlaps display light, the intensity of a display image is reduced so that the reduction of intensity is apt to cause lowering of contrast.

From the point of view of exiting of light in a direction of a normal line and prevention of overlapping between leaking light and display light, it is preferable that each of structures as a transmission light reflection surface A1, and a counter surface A2 facing the transmission light reflection surface A1. The transmission light reflection surface A1 is inclined at an inclination angle θ1 in a range of from 30 to 45 degrees with respect to the reference plane on a side which is one of the upper and lower surfaces of the light pipe and which has no light output means as shown in FIG. 3, that is, on a side which serves as a light exit surface. The counter surface A2 is inclined at an inclination angle θ2 of not smaller than 40 degrees with respect to the reference plane.

The aforementioned transmission light reflection surfaces A1 have a role of reflecting light incident on the incidence side surfaces to thereby supply the reflected light to the light exit surface. In this case, by setting the inclination angle θ1 to be in a range of from 30 to 45 degrees, transmission light can be reflected well perpendicularly to the light exit surface. Thus, output light favorable for display can be obtained efficiently. From the point of view of aforementioned properties such as total reflection based on Snell laws, suppression of leaking light, suppression of disturbance of viewing due to the leaking light, etc., each of the inclination angles θ1 of the transmission light reflection surfaces A1 is preferably in a range of from 35 to 44 degrees, more preferably in a range of from 38 to 43 degrees.

If each of the inclination angles θ1 of the transmission light reflection surfaces A1 is smaller than 30 degrees, the direction of light exiting from the light exit surface has a large angle with respect to the normal line. As a result, the quantity of light allowed to be effectively used for viewing is reduced so that brightness is apt to be lowered. If each of the inclination angles θ1 of the transmission light reflection surfaces A1 is larger than 45 degrees, the quantity of light leaking from the light output means-forming surface is increased so that contrast of a display image is apt to be lowered.

On the other hand, the counter surfaces A2 are surfaces produced inevitably due to the formation of the transmission light reflection surfaces. It is preferable that the surface portions between prismatic structures are not narrowed as possible due to presence of the projected width of the counter surfaces A2 on the aforementioned reference plane. That is, when the light pipe is applied to a front-lighting system for a reflection type liquid-crystal display device, the upper portion 11a between prismatic structures in the drawing serves as a portion for transmitting a display image from a liquid-crystal cell. When the light pipe is applied to a back-lighting system for a transmission type liquid-crystal display device, the upper portion 11a between prismatic structures serves as a portion for transmitting light reflected through a reflection layer, or the like. Hence, if the aforementioned upper portion 11a is narrowed due to presence of the projected width of the counter surfaces A2, both visibility and light utilizing efficiency are lowered.

Hence, the projected width of the counter surfaces is preferably formed so that the surface portions between prismatic structures are as wide as possible. In this respect, the inclination angle θ2 of the counter surfaces with respect to the reference plane is selected to be not smaller than 40 degrees, preferably not smaller than 50 degrees, more preferably not smaller than 60 degrees. If the inclination angle θ2 is not smaller than 90 degrees, the projected width of the counter surfaces may become zero or overlap the projected width of the transmission light reflection surfaces.

Hence, as described above, by adjusting the inclination angles of the transmission light reflection surfaces and counter surfaces in the prismatic structures constituting the light output means, high-grade directivity can be given to output light. Hence, light can be outputted in a direction perpendicular to the light exit surface or at an angle near the perpendicular direction. Incidentally, each of the slopes in the prismatic structures constituting the light output means can be formed into any suitable surface shape inclusive of a linear surface shape, a bent surface shape, a curved surface shape, etc. The prismatic structures may be constituted by a repetitive structure of prismatic structures different in shape. The prismatic structures may be formed with the ridgelines formed by a continuous structure in which the prismatic structures are continuous. On the contrary, the prismatic structures may be formed with the ridgelines formed by an intermittent irregularity structure in which the prismatic structures are disposed discontinuously at intervals of a predetermined distance in the ridgeline direction.

In consideration that the pixel pitch of the liquid-crystal cell is generally in a range of from 100 to 300 μm; and from the point of view of keeping the area of the aforementioned surface portions between prismatic structures large to prevent occurrence of moire due to interference with the pixels of the liquid-crystal cell, formability of sharp structures, etc.; the size of each of the transmission light reflection surfaces is selected, preferably, to be not larger than 40 μm, more preferably in a range of from 3 to 20 μm, further preferably in a range of from 5 to 15 μm in terms of the projected width thereof on the reference plane of the light exit surface.

From the aforementioned point of view, it is preferable that the distance between adjacent ones of the transmission light reflection surfaces is large. As described above, however, the transmission light reflection surfaces serve as a functional portion for substantially outputting light incident on the side surfaces. Hence, if the distance is too large, illumination light becomes so sparse that display may be unnatural. In consideration of these problems, the repetition pitch P (see FIG. 3) of the prismatic structures is preferably selected to be in a range of from 80 μm to 1 mm. Incidentally, the pitch may be irregular as represented by a random pitch, a random or regular combination of a predetermined number of pitch units, or the like. It is, however, preferable from the point of view of prevention of moire, external appearance, etc. that the pitch is constant.

From the point of view of obtaining a brighter display image, the repetition pitch of the prismatic structures is selected preferably to be not smaller than 8 times, more preferably not smaller than 10 times, further preferably not smaller than 12 times as large as the projected width of the transmission light reflection surfaces on the reference plane of the light exit surface. Hence, a great part of the display image generated by the liquid-crystal cell can be transmitted through the upper or lower surface portion between the repetition pitch of the prismatic structures when the light pipe is applied to a front-lighting system for a reflection type liquid-crystal display device. On the other hand, when the light pipe is applied to a back-lighting system for a transmission type liquid-crystal display device, the area of the reflection surface or transmission surface can be kept large. This is favorable for improvement of light utilizing efficiency.

When the light output means is constituted by a repetitive prismatic structures, moire may occur because of interference between the light output means and the pixels of the liquid-crystal cell. Although moire can be prevented by adjusting the pitch of the prismatic structures, the pitch of the prismatic structures is limited to the aforementioned preferable range. Hence, as measures against the case where moire occurs though the pitch is in the aforementioned range, a method in which the structures are formed to be inclined with respect to the reference plane of the incidence side surfaces so that the structures can be arranged to cross the pixels is used preferably. On this occasion, if the inclination angle is too large, deflection occurs in reflection through the transmission light reflection surfaces, or the like. As a result, large deviation occurs in the direction of output light. Hence, anisotropy in the intensity of light emission in the light-transmitting direction of the light pipe becomes large, so that light utilizing efficiency is lowered. This is apt to cause lowering of display quality.

From the aforementioned point of view, each of the inclination angles of the direction of arrangement of the prismatic structures with respect to the reference plane of the incidence side surfaces, that is, each of the inclination angles θa and θb of the direction of ridgelines of the prismatic structures is selected preferably to be in a range of ±30 degrees, more preferably in a range of ±25 degrees, further preferably in a range of ±20 degrees. Incidentally, the symbol "±" means the direction of inclination with the incidence side surfaces as a reference. If moire is negligible, it is preferable that the prismatic structures are arranged to be as parallel with the incidence side surfaces as possible, as illustrated in Fig.

Although the above description has shown a light output means corresponding to one incidence side surface, it is preferable that all light output means corresponding to incidence side surfaces in the present invention satisfy the aforementioned condition. However, the light output means need not have the same structure and pitch of the prismatic structures and can be determined suitably in accordance with dimensions in the left-right direction and the front-rear direction of the light pipe or each pixel, etc.

In the present invention, the light output means A in the left-right direction of the plate-like member 1 cross the light output means B in the front-rear direction of the plate-like member 1 as shown in FIGS. 1 and 2. In this case, from the aforementioned point of view of prevention of moire, etc., the ridgelines of the prismatic structures as the light output means provided for the respective incidence side surfaces cross one another preferably at an angle of not smaller than 40 degrees, more preferably at an angle of not smaller than 60 degrees.

The light pipe may be formed into a suitable shape. Generally, as shown in the drawings, from the point of view of securing incidence side surfaces in the left-right direction and in the front-rear direction, it is preferable that the light pipe is provided as a plate in which incidence side surfaces 13a and 13b and counter ends 14a and 14b opposite to the incidence side surfaces 13a and 13b respectively are all equal in thickness. The light exit surface of the light pipe, that is, either upper or lower surface of the light pipe having no light output means is generally provided as a flat surface. However, when the light pipe is applied to a front-lighting system for a reflection type liquid-crystal display device so that the light pipe is viewed from the upper surface, the light output means may interfere with a pattern of the light output means reflected on the light exit surface in the direction of viewing so that a moire phenomenon may occur due to the interference. To prevent lowering of display quality due to the moire, the light exit surface may be provided to have a structure in which fine prismatic structures provided as occasion demands.

The fine structures in the light exit surface can be formed by a suitable method similar to the formation of the background-art diffusing layer. Examples of the method include a surface roughening method using matting such as sandblasting, a method for giving fine prismatic structures by using a mold, or the like, when the light pipe is formed, a method for applying a resin layer containing transparent particles, a method for providing diffusing dots on the light pipe or for providing a sheet having diffusing dots on the light pipe, etc.

Also the shapes of side surfaces such as the incidence side surfaces in the light pipe may be determined suitably without any particular limitation. Generally, from the point of view of arrangement of a light source, etc., it is preferable that the incidence side surfaces are provided as surfaces perpendicular to the light exit surface. Alternatively, each of the incidence side surfaces may be provided as a concave shape etc. corresponding to the external shape of a cathode tube. Each of the incidence side surfaces may be shaped so convexly as to be protruded through transparent members 15a and 15b as shown in FIG. 2. Such a protrusive shape is provided for the purposes of: preventing spatial interference between non-light-emission portions due to electrode portions, or the like, of light sources to be arranged in the left-right and front-rear directions 13a and 13b respectively; preventing variation in light emission from occurring in end portions, or the like, because of shortage (short size) of the light source length due to increase of the optical path length; and so on.

As described above, the protrusive shape contributes to prevention of variation in light emission in terms of the relationship with the light source arranged on the protrusive incidence side surface side. On the other hand, the protrusive shape is however apt to generate shade in terms of the relationship with the light source arranged on the other side than the protrusive incidence side surface side because light is hardly incident on the protrusive portion. That is, in the example shown in FIG. 2, light from light sources in the front-rear direction is hardly incident on the protrusive portion 15a in the left-right direction and light from light sources in the left-right direction is hardly incident on the protrusive portion 15b in the front-right direction, so that shade is apt to be produced in the protrusive portions.

With respect to this point, in the present invention, the ridgelines of the prismatic structures in the light output means can be inclined to prevent the production of shade. That is, as illustrated in FIG. 2, the ridgelines of the prismatic structures in the light output means A provided for the incidence side surface 13a in the left-right direction can be inclined at an angle θa so as to go far from the incidence side surface 13b side in the front-rear direction toward the other end 14b side with reference to the incidence side surface in the left-right direction. In such a manner, output light through the transmission light reflection surface is made to output in a direction toward the aforementioned shaded protrusive portion to compensate for shortage of light emission due to the shade. Thus, the shade can be prevented from occurring. On the other hand, the ridgelines of the prismatic structures in the light output means B provided for the incidence side surface 13b in the front-rear direction can be inclined at an angle θb so as to go far from the incidence side surface 13a side in the left-right direction toward the other end 14a side with reference to the incidence side surface in the front-right direction. In such a manner, output light through the transmission light reflection surface is made to output in a direction toward the shaded protrusive portion to compensate for shortage of light emission due to the shade. Thus, the shade can be prevented from occurring.

The light pipe can be made of a suitable material giving transparency to the light pipe in accordance with the wavelength range of the light source. Incidentally, examples of the material used in a visible light range include transparent resin represented by acrylic resin, polycarbonate resin, polyester resin, norbornene resin, polyolefin resin or epoxy resin; glass; etc. A light pipe made of a material exhibiting no birefringence or small birefringence may be used preferably.

The light pipe can be formed by a suitable method such as a cutting method. Examples of the production method preferable from the point of view of mass production, etc. include: a method in which a thermoplastic resin is pressed against a mold capable of forming a predetermined shape by heating to thereby transfer the shape; a method in which a mold capable of forming a predetermined shape is filled with a hot-melted thermoplastic resin or a resin fluidized by heat or by a solvent; a method in which a fluid resin polymerizable by heat, ultraviolet rays or radial rays, etc. is polymerized in the condition that the fluid resin is cast in a mold capable of forming a predetermined shape, or in the condition that a mold capable of forming a predetermined shape is filled with the fluid resin; and so on.

The thickness of the light pipe can be determined suitably in accordance with the size of the light pipe, the size of the light source, etc. based on the purpose of use. Generally, the thickness of the light pipe used for forming a transmission type or reflection type liquid-crystal display device, or the like, is not larger than 20 mm, particularly in a range of from 0.1 to 10 mm, more particularly in a range of from 0.3 to 5 mm in accordance with the thickness of the incidence side surfaces. Incidentally, the light pipe need not be formed as a monolithic single-layer plate made of one kind of material. For example, the light pipe may be formed as a laminate of parts made of one kind of material or different kinds of materials. For example, the light pipe may be provided as a plate in which a sheet having a light output means adheres to a light guide portion for performing transmission of light.

Figure 5:
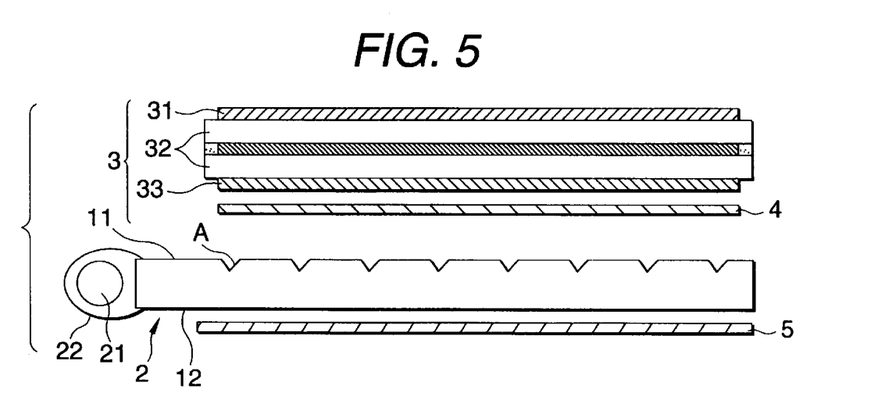
FIG. 5 is a view for explaining an example of a transmission type liquid-crystal display device using a back-lighting system.

The plane light source unit according to the present invention is provided for use as a side-lighting type front-lighting or back-lighting system in a transmission type or reflection type liquid-crystal display device, or the like. As illustrated in FIGS. 4 and 5, light sources 21 are disposed on the incidence side surfaces 13a and 13b, respectively, of the light pipe 1. A suitable material exhibiting light emission characteristic in monochromatic light or in various wavelength ranges can be used as the light source in accordance with the purpose of use of the plane light source unit without any particular limitation.

Incidentally, examples of the aforementioned light source include: a point light source such as a (cold or hot) cathode tube, a light-emitting diode, etc.; an array of such point light sources; a linear light source obtained by conversion of light of point light sources; a slender electroluminescent device; and so on. In the plane light source unit used for forming a liquid-crystal display device, a material exhibiting light-emitting characteristic in a wavelength range which is as wide as possible in a visible light range is preferably used. The combination of light sources arranged on the light pipe can be determined suitably in accordance with the purpose of use. For example, one kind of light sources may be used or light sources different in light emission color may be used. Each of the light sources may be designed to be switched on/off independently or dependently by using a suitable system.

Figure 6:
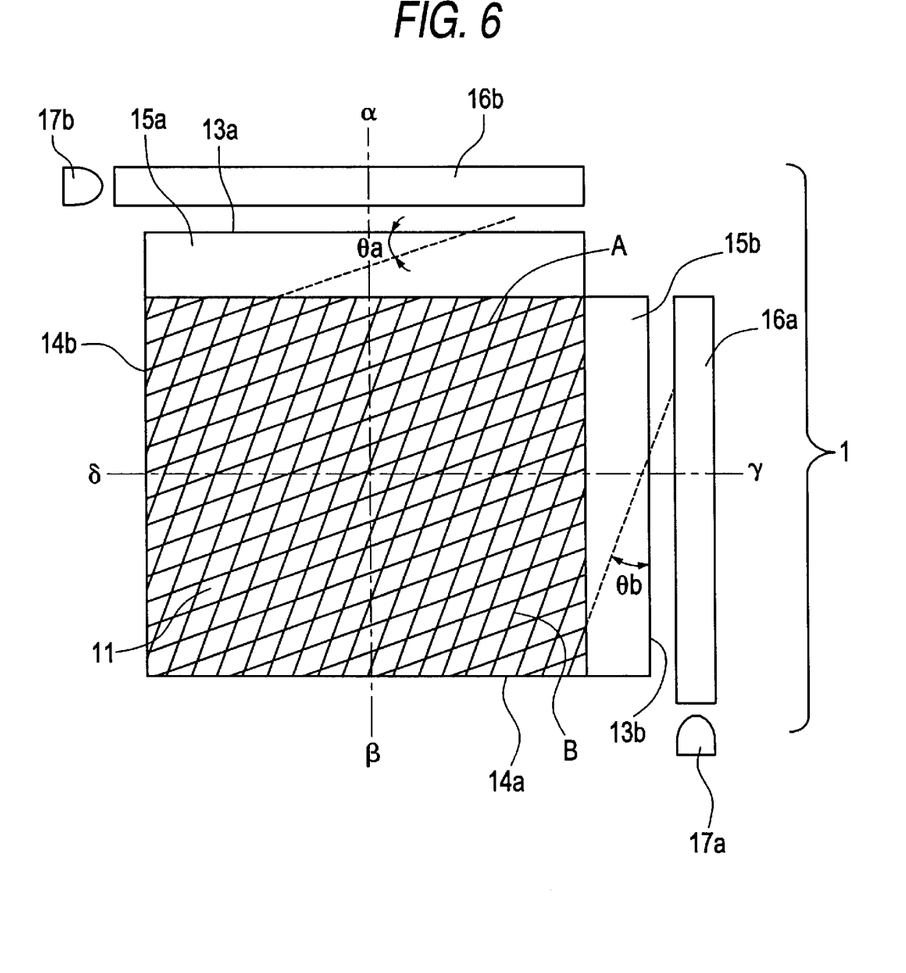
FIG. 6 is a view for explaining an example of the linear light source constituted by a combination of a point light source and a linear light pipe.

FIG. 6 provides an example of a point light source 17a, 17b and a linear light pipe 16a, 16b for converting incident light from the point light source 17a, 17b into the linear light source 16a, 16b.

From the point of view of low or middle level of power consumption, convenience of a light source driver, easiness of switching on/off, easiness of assembling of different-color emission light sources, etc., it is preferable that light-emitting diodes are used, especially for forming a linear light source. An example of the linear light source formed by conversion of light from point light sources is as follows. Point light sources are arranged on the back and side surfaces of a linear light pipe which is made of a rectangular parallelepiped, or the like, and which is formed such that the point light sources can be arranged on the incidence side surfaces in the same manner as in the aforementioned light pipe so that incidence light from the point light sources can be converted to form a linear light source. In this case, in a system in which point light sources are disposed on side surfaces of a linear light pipe, an optical path changing means having a suitable shape constituted by a dot structure or a repetitive structure of prismatic structures may be provided on the back of the linear light pipe.

The plane light source unit may be formed as a combination in which suitable assisting means such as light source holders 22 etc. for enclosing the light sources 21 to lead light radiated from the light sources to the incidence side surfaces of the light pipe are arranged together with the light source 21 as illustrated in FIGS. 4 and 5. A resin sheet coated with a high-reflectance metal thin film, a sheet of metal foil, a white sheet, or the like, is generally used as each of the light source holders. When the plane light source unit is used as a back-lighting system, each of the light source holders may be extended to the light exit surface of the light pipe so that the light source holder can serve also as a reflection sheet.

The plane light source unit according to the present invention provides a plane light source excellent in brightness because the plane light source unit utilizes light from the light sources efficiently. It is easy to increase the area of the plane light source unit. Hence, the plane light source unit can be applied preferably to various devices such as a front-lighting system for a reflection type liquid-crystal display device or a back-lighting system for a transmission type liquid-crystal display device.

FIG. 4 shows an example of a reflection type liquid-crystal display device using the plane light source unit as a front-lighting system. In FIG. 4, a reflection type liquid-crystal display unit 3 is formed to have polarizers 31 and 33 on both the front and back sides of a liquid-crystal cell 32 and to further have a reflection layer 34 on the back side of the polarizing plate 33, and the thus formed display unit 3 is arranged on the light exit surface (lower surface 12) side of the light pipe 1 which has the light output means in the upper surface 11 of the plane light source unit 2. When the plane light source unit is switched off, the liquid-crystal display device can serve also as a reflection type liquid-crystal display device using external light.

On the other hand, FIG. 5 shows an example of a liquid-crystal display device using the plane light source unit as a back-lighting system. A transmission type liquid-crystal display unit 3 is formed to be disposed through a light diffusing layer 4 on the upper side of the light pipe 1 in the plane light source unit 2. The light pipe 1 has a reflection layer 5 formed on the light exit surface. Hence, the liquid-crystal display device can serves not only as a transmission type liquid-crystal display device but also as a reflection-transmission double type liquid-crystal display device.

Incidentally, FIG. 5 shows an example in which a transmission type liquid-crystal cell 32 is disposed on the upper surface side of the light pipe in the plane light source unit 2 using the light pipe 1 having the light output means in the upper surface 11. However, the transmission type liquid-crystal cell 32 may be applied to a light pipe having the light output means in the lower surface 12. Hence, either the light-output-means-forming surface of the light pipe or the non-light-output-means-forming surface thereof can be disposed at the liquid-crystal cell side. On this occasion, when a light reflection means such as a reflection layer is disposed on the back side of the light pipe, that is, on the side in which the liquid-crystal cell is not disposed, a liquid-crystal display device serving as a reflection-transmission double type liquid-crystal display device can be formed.

As illustrated in the aforementioned drawings, the liquid-crystal display device is at least constituted by the plane light source unit and the liquid-crystal cell and is formed by disposing the liquid-crystal cell on a predetermined surface side of the light pipe 1 in the plane light source unit. On this occasion, in the reflection type liquid-crystal display device using the plane light source unit as a front-lighting system, the plane light source unit 2 is arranged on the visual side of the liquid-crystal display unit 3 having the reflection layer 34 on its back as shown in FIG. 4 so that the light output means-forming surface of the light pipe 1 in the plane light source unit 2 is positioned on the upper side (visual side).

Hence, it is essential to the reflection type liquid-crystal display device using a front-lighting system that at least the liquid-crystal layer of the liquid-crystal cell is positioned between the light pipe in the plane light source unit and the reflection layer so that the light output means-forming surface of the light pipe is disposed on the visual side. The visual recognition is performed as follows. External light transmitted from outside through the portions 11a between the light output means in the light pipe of the plane light source unit or light exiting from the light pipe at the time of switching-on is transmitted through the liquid-crystal cell and then turned over by the reflection layer. The turned-over light is transmitted through the liquid-crystal cell again and further transmitted through the portions 11a in the light pipe. Incidentally, the aforementioned reflection layer may be attached to a cell substrate, or the like, so that the reflection layer can be provided inside the liquid-crystal On the other hand, in the transmission type liquid-crystal display device using the plane light source unit as a back-lighting system as shown in FIG. 5, the light pipe of the plane light source unit is disposed on the back side (opposite to the visual side) of the liquid-crystal cell. When the light pipe having the light output means-forming surface on the visual side or when the liquid-crystal display device is used as a transmission-reflection double type liquid-crystal display device, the light pipe of the plane light source unit is disposed between the liquid-crystal cell and the reflection layer. In these cases, the plane light source unit may be arranged so that the light output means-forming surface side of the light pipe is disposed at the liquid-crystal cell side in the aforementioned manner, or, the plane light source unit may be arranged, contrary to the drawing, so that the light exit surface side of the light pipe having no light output means is provided at the liquid-crystal cell side.

In the method in which the light output means-forming surface side of the light pipe is disposed at the liquid-crystal cell side and light is turned over by the reflection layer disposed on the light exit surface as shown in FIG. 5, the optical path length incident from the light output means to the liquid-crystal cell is increased so that the emission-line pattern of the light output means can be moderated as described above. This method has an advantage in that occurrence of display failure such as moire can be suppressed in comparison with the method, contrary to the drawing, in which the light exit surface of the light pipe is disposed at the liquid-crystal cell side.

Visual recognition of the aforementioned transmission type liquid-crystal display device is performed as follows. Light exiting from the plane light source unit enters the liquid-crystal cell directly or through turn-over at the reflection layer, so that the light is transmitted through the liquid-crystal cell. On the other hand, visual recognition of the reflection-transmission double type liquid-crystal display device is performed as follows. In a transmission mode, visual recognition is performed in the same manner as in the transmission type liquid-crystal display device. In a reflection mode, external light is transmitted through the liquid-crystal cell and turned over by the reflection layer on the back of the light pipe. The turned-over light is transmitted through the portions 11a between the light output means in the light pipe and through the liquid-crystal cell again. Thus, visual recognition in the reflection mode is performed.

Generally, the liquid-crystal display device is formed suitably by assembling a liquid-crystal display unit including a liquid-crystal cell 32 having a transparent electrode functioning as a liquid-crystal shutter as shown in FIGS. 4 and 5, a driver attached to the liquid-crystal cell 32, a polarizer, etc., by assembling a back-lighting or front-lighting system including a change-over switch for changing over light-on/off as occasion demands and by assembling constituent parts such as a light diffusing layer 4, a reflection layer 5, an anti-reflection layer, a compensatory phase retarder, etc. as occasion demands.

In the present invention, the liquid-crystal display device can be formed, as shown in the drawing, in the same manner as in the background art without any particular limitation except that the aforementioned light pipe or plane light source unit is used. Hence, the liquid-crystal cell used is not particularly limited. For example, on the basis of the format of orientation of liquid crystal, there can be used a suitable liquid-crystal cell such as a TN liquid-crystal cell, an STN liquid-crystal cell, a perpendicularly oriented cell, an HAN cell, a twisted or non-twisted cell such as an OCB cell, a guest-host liquid-crystal cell, or a ferroelectric liquid-crystal cell. Further, the method for driving liquid crystal is not particularly limited. For example, a suitable drive method such as an active matrix method or a passive matrix method may be used.

Incidentally, in FIGS. 4 and 5, the liquid-crystal cell 32 has a liquid-crystal layer enclosed in cell substrates. In this case, one of the cell substrates may serve also as the light pipe according to the present invention. In FIGS. 4 and 5, a transparent electrode and a driver attached to the liquid-crystal cell 32 are not shown.

Also, the polarizing plate provided on one or both of the front and back sides of the liquid-crystal cell is not particularly limited. Particularly from the point of view of obtaining good-contrast-ratio display by incidence of high-grade linearly polarized light, etc., a material high in the degree of polarization such as an absorption type linear polarizer of iodine, dye, or the like can be used preferably as the back-lighting side or front-lighting side polarizing plate.

The reflection layer can be also formed as a suitable reflection layer according to the background art. Examples of the reflection layer include: a coating layer containing powder of a high-refractive-index metal such as aluminum, silver, gold, copper, chromium, etc. in a binder resin; a layer of a metal thin film deposited by a vapor deposition method, or the like; a reflection sheet having the coating or deposited layer supported by a base material; a sheet of metal foil; and so on. When the reflection layer is provided inside the liquid-crystal cell, the reflection layer is preferably formed by a method of forming an electrode pattern of a high electrically conductive material such as the aforementioned high-reflectance metal acting as the reflection layer, or by a method of providing a transparent electrode pattern on the reflection layer of a high-reflectance metal film through an electrically insulating layer.

Incidentally, the reflection layer in the reflection type liquid-crystal display device may be provided outside the liquid-crystal cell, for example, in the condition that a reflection layer made of a high-reflectance metal film is provided on a plastic film. In the case of a transmission type liquid-crystal display device, the reflection layer may be directly attached to the light pipe for forming a back-lighting system. The reflection layer can be provided on either the light output means-forming surface or the light exit surface of the light pipe in accordance with the mode of use of the light pipe by a suitable method as illustrated above.

When the liquid-crystal display device is formed, suitable optical devices such as an anti-glare layer or an anti-reflection film provided on the visual side surface, a light diffusing plate, a compensatory retarder plate, a polarization separating plate, a prism sheet for controlling the optical path, etc. can be disposed in suitable positions respectively as described above. Incidentally, the anti-reflection film may be provided on the light exit surface of the light pipe.

The aforementioned compensatory phase retarder is provided to compensate for wavelength dependence of birefringence, or the like, so as to attain improvement of visibility, or the like. The compensatory retarder plate is disposed either between the visual side polarizing plate and the liquid-crystal cell and/or between the back-lighting side polarizing plate and the liquid-crystal cell as occasion demands. A suitable plate in accordance with the wavelength range etc. can be used as the compensatory phase retarder. The compensatory retarder plate can be obtained as a birefringent sheet made of a drawn film of polycarbonate, polysulfone, polyester, polymethyl methacrylate, polyamide, polyvinyl alcohol, or the like; or as a support sheet of an oriented layer of liquid-crystal polymer. Alternatively, the compensatory retarder plate may be formed as a laminate of two layers or more of the phase-difference sheets, etc.

The light diffusing layer is provided to obtain surface light emission of uniform brightness based on prevention of unevenness in brightness, to reduce moire based on mixture of adjacent light rays, etc. One light diffusing layer may be disposed in a suitable position of the liquid-crystal display device as occasion demands or a plurality of light diffusing layers may be disposed in suitable positions of the liquid-crystal display device as occasion demands. Incidentally, in FIG. 5, the light diffusing layer 4 is disposed between the light pipe 1 and the liquid-crystal display unit 3. Incidentally, from the point of view of keeping the directivity of light exiting from the light pipe, etc., a diffusing layer having a narrow diffusing range can be used preferably.

The light diffusing layer can be formed by a suitable method in accordance with the aforementioned fine structures of the light exit surface. Examples of the method include: a method of applying and curing a low-refractive-index transparent resin containing high-refractive-index transparent particles dispersed therein; a method of applying and curing a transparent resin containing air bubbles dispersed therein; a method of swelling a surface of a base material by a solvent to thereby generate a craze; a method of forming a transparent resin layer having an irregular rough surface; a method using a diffusing sheet formed in the aforementioned manner; etc.

Incidentally, when the transmission type liquid-crystal display device is formed, a polarization separating plate may be disposed between the plane light source unit and a polarizer in order to improve luminance. The polarization separating plate has a function of separating natural light into polarized light through transmission and reflection. The polarization separating plate is represented by a sheet having a layer having a cholesteric liquid-crystal phase, particularly having a layer made of a liquid-crystal polymer exhibiting a cholesteric phase, or by a dielectric multilayer film provided on a transparent substrate. Incidentally, according to the cholesteric liquid-crystal phase, natural light can be separated into left and right circularly polarized light groups through transmission and reflection. According to the aforementioned dielectric multilayer film, natural light can be separated into linearly polarized P-wave and S-wave light groups through transmission and reflection. Further, the circularly polarized light can be converted into linearly polarized light through a quarter-wavelength plate.

Therefore, when polarized light transmitted through the polarization separating plate is made incident on a polarizing plate while the axes of polarization are made as coincident as possible, absorption loss due to the polarizer can be suppressed so that improvement of luminance can be achieved. In the plane light source unit constituted by the light guide unit 1 having the reflection layer 5 on its back as shown in FIG. 5, polarized light reflected through the aforementioned polarization separating plate can be turned over by the reflection layer 5 and made to enter the polarization separating plate again. Hence, the turned-over light can be partially or wholly transmitted, so that improvement of luminance can be achieved by the improvement in light utilizing efficiency.

In the present invention, optical devices or parts such as a light pipe for forming the aforementioned plane light source unit or liquid-crystal display device, a liquid-crystal cell, a polarizer, etc. may be wholly or partially integrally laminated/fixed onto one another or may be disposed separably. From the point of view of prevention of lowering of contrast due to suppression of interface reflection, etc., it is preferable that such optical devices or parts are fixed onto one another. A suitable transparent adhesive agent such as a tackifier can be used for the closely fixing process.

EXAMPLE 1

An upper surface of a uniform-thickness rectangular flat plate made of polymethyl methacrylate was cut by a diamond tool to thereby form light output means in parallel with the respective incidence side surfaces in the left-right direction and in the front-rear direction. Thus, a light pipe was obtained. The light pipe was 38 mm in the left-right direction, 25 mm in the front-rear direction and 1 mm thick. The light pipe had transparent portions of a protrusion length of 3 mm provided in the incidence side surfaces in the left-right direction and the front-rear direction, respectively. The incidence side surface in the left-right direction was located on the front side of the incidence side surface in the front-rear direction. The incidence side surface in the front-rear direction was located on the right side of the incidence side surface in the left-right direction.

The aforementioned light output means in the left-right direction was constituted by a repetitive structure of prismatic structures formed at intervals of a predetermined pitch of 260 μm. Each of the prismatic structures had a transmission light reflection surface facing the incidence side surface, and a counter surface facing the transmission light reflection surface. The inclination angle of the transmission light reflection surface was 43 degrees, and the inclination angle of the counter surface was 62 degrees. The projected width of the transmission light reflection surface on the lower surface of the light pipe was in a range of from 10 to 16 μm. The ratio of the protected width of each upper surface portion between the adjacent prismatic structures on the lower surface to the projected width of the prismatic structures on the lower surface was not smaller than 10.

The light output means in the front-rear direction was constituted by a repetitive structure of prismatic structures disposed at intervals of a predetermined pitch of 310 μm. Each of the prismatic structures had a transmission light reflection surface facing the incidence side surface, and a counter surface facing the transmission light reflection surface. The inclination angle of the transmission light reflection surface was 43 degrees, and the inclination angle of the counter surface was 62 degrees. The projected width of the transmission light reflection surface on the lower surface of the light pipe was in a range of from 9 to 16 μm. The ratio of the projected width of each upper surface portion between the adjacent prismatic structures on the lower surface to the projected width of the prismatic structures on the lower surface was not smaller than 12.

Then, one green light-emitting diode and one red light-emitting diode were provided on each of left and right surfaces of a linear light pipe having an effective light emission width of 41 mm. The light-emitting diodes were connected to DC power supplies in accordance with color. Thus, a light source 1 was prepared. Incidentally, the linear light pipe was made of a rectangular parallelepiped 42 mm wide, 2.5 mm deep and 1.5 mm thick. The light source 1 was disposed on the incidence side surface in the left-right direction, of the aforementioned light pipe. Further, one red light-emitting diode was provided on each of front and back surfaces of a linear light pipe having an effective light emission width of 28 mm. The light-emitting diodes were connected to a DC power supply. Thus, a light source 2 was prepared. Incidentally, the linear light pipe was made of a rectangular parallelepiped 29 mm wide, 2.5 mm deep and 1.5 mm thick. The light source 2 was disposed on the incidence side surface in the front-rear direction, of the aforementioned light pipe. Thus, a plane light source unit was obtained.

Then, a reflection type twisted nematic liquid-crystal display unit was disposed on the lower surface side of the light pipe in the aforementioned plane light source. Thus, a reflection type liquid-crystal display device using a front-lighting system was obtained. Incidentally, visual recognition was performed through the upper surface side of the light pipe in which the light output means was formed.

EXAMPLE 2

A light pipe, a plane light source unit and a reflection type liquid-crystal display device were obtained in the same manner as that in Example 1 except that the light output means in the left-right direction was formed so that the ridgelines of the prismatic structures was inclined up rightward at an angle of 14 degrees with respect to the incidence side surface in the left-right direction and except that the light output means in the front-rear direction was formed so that the ridgelines of the prismatic structures was inclined up frontward at an angle of 14 degrees with respect to the incidence side surface in the front-rear direction.

As a result of inclination of the aforementioned light output means, the projected width of the transmission light reflection surface of the light output means in the left-right direction, on the lower surface was changed to a range of from 10 to 18 μm. In the light output means in the left-right direction, the ratio of the projected width of each upper surface portion between the adjacent prismatic structures on the lower surface to the projected width of the prismatic structures on the lower surface was changed so as to be not smaller than 8. On the other hand, the projected width of the transmission light reflection surface of the light output means in the front-rear direction, on the lower surface was changed to a range of from 9 to 18 μm. In the light output means in the front-rear direction, the ratio of the projected width of each upper surface portion between the adjacent prismatic structures on the lower surface to the projected width of the prismatic structures on the lower surface was changed so as to be not smaller than 10.

EXAMPLE 3

The plane light source unit obtained in Example 2 was disposed in the condition that the light pipe was turned upside down. A reflection plate made of a white polyester film was disposed on the lower side of the light output means-forming surface (which was the original upper surface) of the light pipe. A transmission type twisted nematic liquid-crystal display unit was disposed, through a diffusing plate, on the light exit surface side (which was the original lower surface side) of the light pipe. Thus, a transmission type liquid-crystal display device using a back-lighting system was obtained.

EXAMPLE 4

A reflection plate coated with silver by vapor deposition was disposed on the lower surface side of the plane light source unit obtained in Example 2. A transmission type twisted nematic liquid-crystal display unit was disposed on the upper surface side of the plane light source unit. Thus, a transmission type liquid-crystal display device using a back-lighting system was obtained.

COMPARATIVE EXAMPLE 1

A light pipe, a plane light source unit and a reflection type liquid-crystal display device were obtained in the same manner as that in Example 1 except that the light output means was constituted by a repetitive structure of prismatic structures each shaped like an isosceles triangle having inclination angles of 43 degrees and disposed at intervals of a predetermined pitch of 260 μm so as to be parallel with the incidence side surface in the left-right direction and except that the light output means in the front-rear direction was omitted. Incidentally, the projected width of the light output means in the light pipe on the lower surface was 12 μm. The ratio of the projected width of each upper surface portion between the adjacent prismatic structures on the lower surface to the projected width of the prismatic structures on the lower surface was not smaller than 8.

COMPARATIVE EXAMPLE 2

A transmission type liquid-crystal display device was obtained in the same manner as that in Example 3 except that the plane light source unit obtained in Comparative Example 1 was used.

COMPARATIVE EXAMPLE 3

A plane light source unit and a transmission type liquid-crystal display device were obtained in the same manner as that in Example 3 except that a light pipe having the light output means on a rough surface formed by sandblasting was used. Incidentally, the plane light source unit was disposed so that the rough surface of the light pipe was located on the lower side.

COMPARATIVE EXAMPLE 4

A transmission type liquid-crystal display device was obtained in the same manner as that in Example 4 except that the plane light source unit obtained in Comparative Example 1 was used.

COMPARATIVE EXAMPLE 5

A transmission type liquid-crystal display device was obtained in the same manner as that in Example 4 except that the plane light source unit obtained in Comparative Example 3 was used.

Evaluation Test 1

The reflection type or transmission type liquid-crystal display device obtained in each of Examples and Comparative Examples was examined as follows. The light source 1 or 2 was switched on in the condition that the liquid-crystal cell was supplied with no voltage. In this condition, frontal luminance in the center portion of the device, frontal luminance in the incidence portion on the lighting side and frontal luminance in a counter portion opposite to the incidence portion were measured by a luminance meter (BM7, made by TOPCON Corp.). Results of the measurement were shown in the following Table. Incidentally, the light source 1 was provided for emitting green light.

| | Frontal Luminance (cd/m$^2$) | | | | | |
| --- | --- | --- | --- | --- | --- | --- |
| | Light Source 1 | | | Light Source 2 | | |
| | Incidence Portion | Center Portion | Counter Portion | Incidence Portion | Center Portion | Counter Portion |
| Example 1 | 23 | 25 | 26 | 13 | 14 | 14 |
| Example 2 | 22 | 24 | 26 | 12 | 12 | 14 |
| Example 3 | 39 | 34 | 32 | 19 | 20 | 19 |
| Example 4 | 35 | 36 | 34 | 17 | 17 | 15 |
| Comparative Example 1 | 26 | 22 | 18 | 15 | 11 | 8 |

-continued

| | Frontal Luminance (cd/m²) | | | | | |
|---|---|---|---|---|---|---|
| | Light Source 1 | | | Light Source 2 | | |
| | Incidence Portion | Center Portion | Counter Portion | Incidence Portion | Center Portion | Counter Portion |
| Comparative Example 2 | 45 | 31 | 27 | 22 | 16 | 13 |
| Comparative Example 3 | 30 | 25 | 22 | 17 | 14 | 10 |
| Comparative Example 4 | 39 | 32 | 29 | 20 | 16 | 13 |
| Comparative Example 5 | 25 | 23 | 18 | 12 | 12 | 11 |

Evaluation Test 2

External appearance of the reflection type or transmission type liquid-crystal display device obtained in each of Examples and Comparative Examples was observed. As a result, in each of Examples, a uniform and bright light emission state was obtained on the whole surface. On the contrary, in each of Comparative Examples, light was emitted intensively in the incidence portion but luminance was reduced greatly as the location went toward the counter portion. Hence, Comparative Examples were inferior in uniformity of light emission. Particularly the diffuse type liquid-crystal device as shown in each of Comparative Examples 3 and 5 was greatly inferior in luminance to each of Examples.

Moreover, in Examples, change of the light emission color to green or red in the light source 1 and change of the light emission color to green or red in the light sources 1 or 2 could be made so that a uniform and bright light emission state was obtained. Red light emission of the light sources 1 and 2 was superior in luminance to light emission of one of the light sources 1 and 2, so that a uniform and brighter light emission state was obtained. In Comparative Examples, however, viewing was not easy because of variation in light emission. It is apparent from the above description that, according to the present invention, the color of emission light can be changed so that a reflection type or transmission type liquid-crystal display device using a front-lighting or back-lighting system excellent in display characteristic can be formed.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A light pipe comprising:
   an upper surface;
   a lower surface;
   side surfaces between said upper and lower surfaces, at lease two of said side surfaces constituting incidence side surfaces each extending in left-right and front-rear directions of said light pipe; and
   light output means formed in one of said upper and lower surfaces so that incident light to said one of said upper and lower surfaces from each of said incidence side surfaces is made to go out from the other one of said upper and lower surfaces by said light output means, said light output means comprising a repetitive structure of prismatic structures having ridgelines extending along each of said incidence side surfaces respectively, wherein said light output means is constituted by the repetitive structure of the prismatic structures which are disposed at intervals of a predetermined pitch in a range of from 80 µm to 1 mm and each of which has a transmission light reflection surface and a counter surface facing said transmission light reflection surface, each of said transmission light reflection surfaces is constituted by a slope facing said incidence side surfaces at an inclination angle in a range of from 30 to 45 degrees with respect to a reference plane of a light exit surface which is located in the other one of said upper and lower surfaces where no light output means is located, a projected width of said transmission light reflection surface on said reference plane is not larger than 40 µm, and each of said counter surfaces is constituted by a slope inclined at an inclination angle of not smaller than 40 degrees with respect to said reference plane.

2. A light pipe according to claim 1, wherein the ridgelines of said prismatic structures in said light output means provided for each of said respective incidence side surfaces cross one another at an angle of not smaller than 40 degrees.

3. A light pipe according to claim 1, wherein said light output means is provided in said upper surface of said plate-like member.

4. A light pipe comprising:
   an upper surface;
   a lower surface;
   side surfaces between said upper and lower surfaces, at lease two of said side surfaces constituting incidence side surfaces each extending in left-right and front-rear directions of said light pipe; and
   light output means formed in one of said upper and lower surfaces so that incident light to said one of said upper and lower surfaces from each of said incidence side surfaces is made to go out from the other one of said upper and lower surfaces by said light output means, said light output means comprising a repetitive structure of prismatic structures having ridgelines extending along each of said incidence side surfaces respectively, wherein each of said two incidence side surfaces is constituted by a protruded transparent member, the ridgelines of said prismatic structures in said light output means provided for the incidence side surface in the left-right direction are inclined in a direction moving away from one incidence side surface in the front-rear direction toward the other end side with reference to the incidence side surface in the left-right direction, and the ridgelines of said prismatic structures in said light output means provided for the incidence side surface in the front-rear direction are inclined in a direction moving away from one incidence side surface in the left-right direction toward the other end side with reference to the incidence side surface in the front-rear direction.

5. A plane light source unit comprising:
   a light pipe according to claim 1; and
   light sources disposed on said incidence side surfaces, respectively, of said light pipe.

6. A plane light source unit according to claim 5, wherein said light sources are different in color light emission and can be switched on/off.

7. A plane light source unit according to claim 5, wherein each of said light sources is a linear light source constituted by a combination of a point light source and a linear light pipe for converting incident light from said point light source into said linear light source.

8. A reflection type liquid-crystal display device comprising:
   a plane light source unit according to claim 5 in which said light pipe has said light output means in the upper surface;
   a liquid-crystal cell with a reflection layer being disposed on the lower surface of said light pipe of said plane light source unit.

9. A transmission type liquid-crystal display device comprising:
   a plane light source unit according to claim 5;
   a transmission type liquid-crystal cell disposed on the upper surface of said light pipe of said light source unit; and
   light reflection means disposed on the lower surface of said light pipe.

* * * * *